United States Patent [19]

Favrot

[11] 4,001,983
[45] Jan. 11, 1977

[54] LOADER ASSEMBLY
[75] Inventor: Paul Favrot, Lyon, France
[73] Assignee: Landis-Gendron S.A., Villeurbanne, France
[22] Filed: Apr. 14, 1975
[21] Appl. No.: 560,757
[52] U.S. Cl. .......................... 51/215 R; 51/215 UE
[51] Int. Cl.² ........................................ B24B 47/22
[58] Field of Search ........ 51/215 R, 215 E, 215 M, 51/215 CP, 215 H, 215 UE, 103 C; 221/308

[56] References Cited

UNITED STATES PATENTS

| 1,654,236 | 12/1927 | Binns | 51/215 R X |
| 1,733,863 | 10/1929 | Caster | 51/215 R X |
| 2,706,369 | 4/1955 | Dix | 51/215 R X |
| 2,896,379 | 7/1959 | Herrmann | 51/215 R |
| 3,553,907 | 1/1971 | Price | 51/103 C |

FOREIGN PATENTS OR APPLICATIONS

| 237,555 | 12/1969 | U.S.S.R. | 51/215 UE |

*Primary Examiner*—Al Lawrence Smith
*Assistant Examiner*—Nicholas P. Godici
*Attorney, Agent, or Firm*—Spencer T. Smith

[57] ABSTRACT

A loader assembly comprising a channel member for gravitationally delivering unground workpieces to and removing finished workpieces from the grinding station of a machine tool such as a cylindrical grinder, the channel member including a magazine portion for holding a plurality of unground workpieces, means for sequentially releasing workpieces from the magazine portion, means for stopping the gravitational displacement of a released workpiece at a predetermined ready position, locator means, means for advancing the locator means from a retracted position beyond the channel to an advanced position within the channel, means for freeing the stopped workpiece after the locator means has been displaced to the advanced position so that the freed workpiece will gravitationally locate against the advanced locating means, and means for selectively retracting the locator means from the advanced position to the retracted position.

5 Claims, 2 Drawing Figures

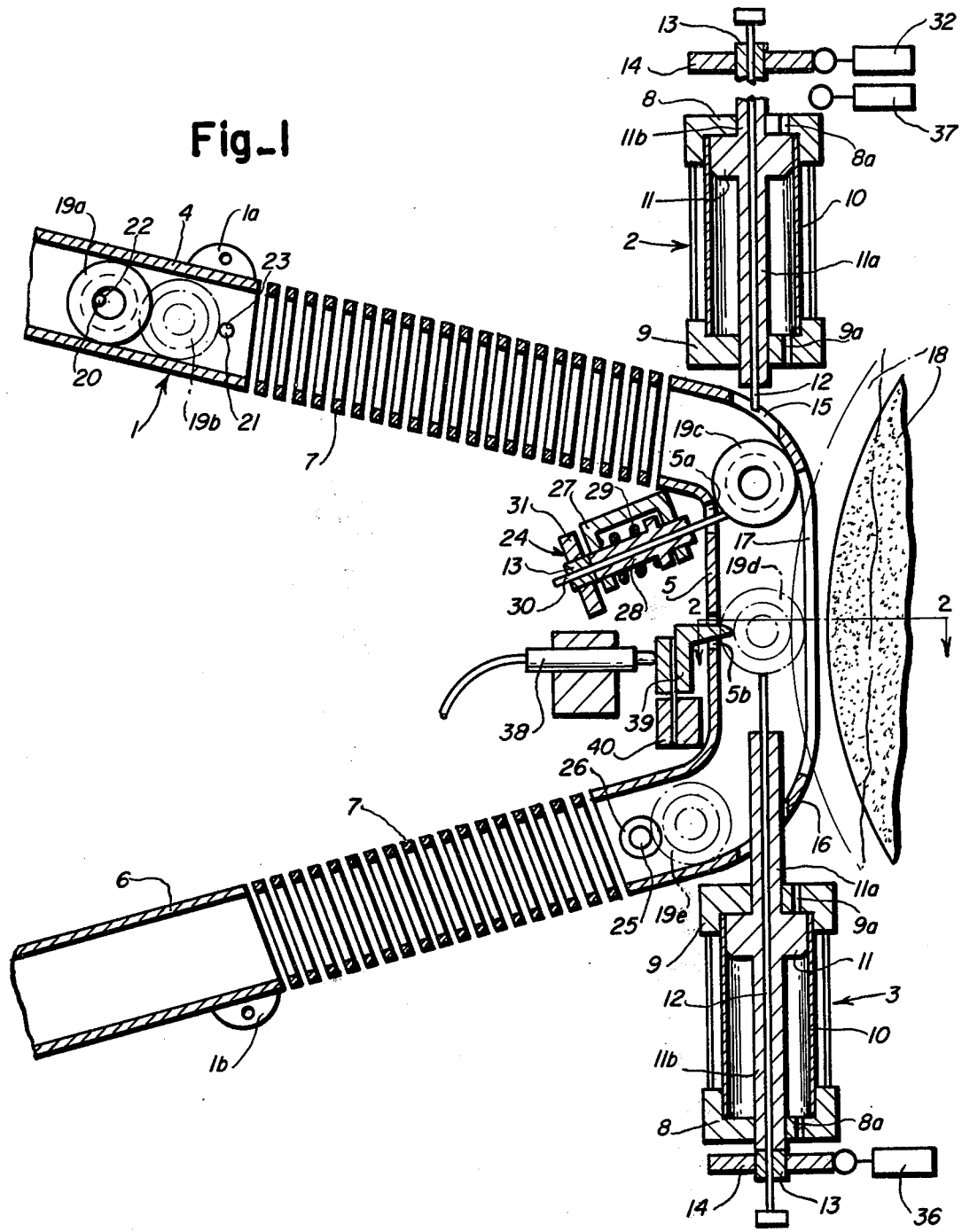
Fig_1
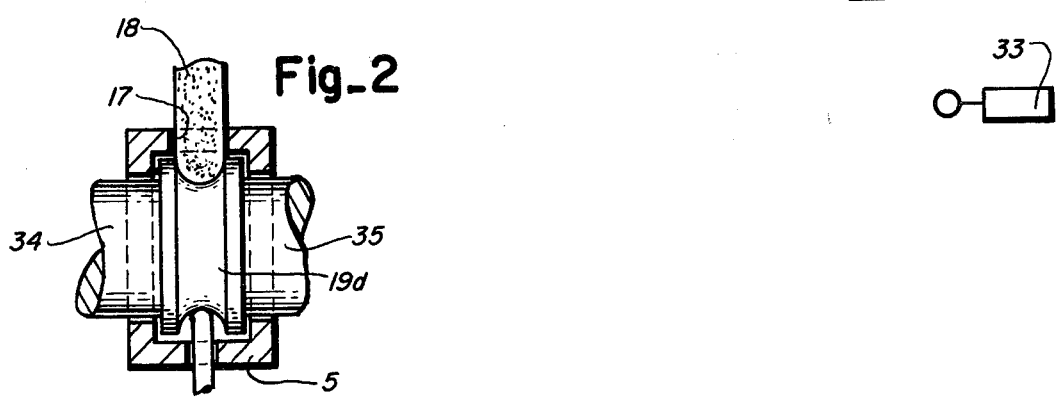
Fig_2

LOADER ASSEMBLY

The present invention relates to loader assemblies for delivering workpieces to the grinding station of a machine tool such as a cylindrical grinder and for removing finished workpieces from the grinding station.

It is an object of the present invention to provide a loader assembly for workpieces having a cylindrical configuration having parallel end surfaces, which can be quickly and easily replaced so that workpieces having a variety of sizes can be economically handled.

Other objects and advantages of the present invention will become apparent from the following portion of this specification and from the accompanying drawings which illustrate in accordance with the mandate of the patent statutes a presently preferred embodiment incorporating the principles of the invention.

Referring to the drawings:

FIG. 1 is a cross-sectional view of a loader assembly made in accordance with the teachings of the present invention; and FIG. 2 is a view of the loader assembly illustrated in FIG. 1 taken along the lines 2—2 thereof.

The loader assembly includes a channel assembly 1 having an upper inclined magazine section 4 for storing a plurality of workpieces, a vertical section 5, and a lower inclined portion 6 which are joined by extensible elastic elements such as spring coils 7. The channel sections 4, 5, and 6, as well as the elastic elements 7 preferably have a configuration which conforms to the configuration of a particular workpiece (FIG. 2). The channel sections are secured to the frame of a machine tool such as a cylindrical grinder in any conventional manner such as with tabs 1a, 1b.

Four identical hydraulic cylinders are utilized to control the flow of workpieces to and from the grinding station (workpiece 19d). Two of these hydraulic cylinders 2, 3 are fully illustrated in FIG. 1. These cylinders include a housing defined by a cylinder 10 which extends between a pair of opposing end covers 8, 9. The end covers each include fluid ports 8a, 9a through which pressurized fluid such as air can be selectively introduced into the housing. A piston including a head portion 11 is slidably received within each housing and includes a pair of shank portions 11a, 11b, which extend coaxially from either side of the head portion 11 and which are slidably received within coaxial bores in the opposing end covers. Each piston additionally includes an axial bore for slidably receiving a pin member 12. A gripping element or chuck including selectively advanceable jaws 13 and a control wheel 14 is secured to the end of the pistons remote from the grinding station so that the pin members can be selectively located at any axial position relative to the pistons.

These hydraulic cylinders are mounted on the machine tool so that the pin members 12 can be selectively advanced from retracted positions, through suitable openings 15, 16 in the vertical channel section 5, to selected advanced positions within the channel.

Third and fourth hydraulic cylinders are mounted on the machine tool so that their pins 20, 21 can be selectively advanced through suitable openings 22, 23 in the upper inclined channel section 4 into the central bore of the rear workpiece 19a and in front of the forward workpiece 19b. In the illustrated embodiment, the forward workpiece has been released and is no longer held in the magazine section 4.

In operation, stock is removed from a workpiece 19d, such as the inner race of a ball bearing, which is supported between a pair of rotatable work centers 34, 35 (FIG. 2) by a rotating grinding wheel 18, which is advanced through a slot 17 in the vertical section 5, into abrasive engagement with the peripheral groove of the inner race. When the workpiece has been reduced to size, a measuring gage 38, having a contact element 39 which passes through an opening 5b in the vertical section 5, generates a size signal. The grinding wheel is reset and the work centers are retracted allowing the finished workpiece to drop past the second hydraulic cylinder 3 which is fully retracted at that time. When the dropped finished workpiece 19e passes a proximity contact 25 which extends through a hole 26 in the vertical section, a signal is generated which results in pressurized air being directed to the advance port 8a of the second cylinder 3 to advance the piston to an advanced position illustrated in FIG. 1. When the piston reaches the advanced position, a switch 36 is closed which results in pressurized air being directed to the advance port 8a of the first hydraulic cylinder 2 to advance the piston from the illustrated retracted position to a fully advanced position. During this displacement, an unground workpiece 19c which is held at the ready position by a resilient stop member 24, is pushed therepast. The workpiece proceeds past the gage, which is resiliently mounted on a block 40, and becomes located on the advanced pin 12 of the second cylinder piston. The advancement of the first cylinder piston closes a second switch 37 which advances the work centers through openings in the vertical section into workpiece engaging position (FIG. 2). When the work centers are fully advanced, a signal is generated to direct pressurized air into the retract ports 9a of the first 2 and second 3 cylinders to retract the pistons thereof and to advance the grinding wheel. When signals have been generated by either or both of the fully retracted switches 32 and 33, normally advanced pin 23 of the third cylinder is retracted and normally retracted pin 22 of the fourth cylinder is conjointly advanced. The forward workpiece 19b in the magazine section 4 is accordingly released to roll down the channel until it is engaged and stopped by the stop member 24. The third and fourth cylinders are conjointly actuated to return the pins 23, 22 to their initial or normal positions to properly place an unground workpiece at the forward position when switch 32 of the first cylinder is closed.

The retractable stop member 24 includes a housing 27 which is mounted on the machine frame. The housing 27 slidably supports a piston 28 similar to those of the hydraulic cylinders. The piston is biased outwardly by a spring 29 so that the pin 30 will normally extend through a suitable opening 5a in the vertical channel section. Its extended position can be selectively varied by operating a chuck arrangement 31, 13, which is secured to the rear end of the piston.

I claim:

1. A loader assembly comprising
   a channel member for gravitationally delivering unground workpieces to and removing finished workpieces from the grinding station of a machine tool such as a cylindrical grinder, said channel member including a magazine portion for holding a plurality of unground workpieces,
   means for releasing workpieces from said magazine portion one at a time, Pin means, means for biasing said pin means to project into said channel for stopping the gravitational displacement of a workpiece after it has been released by said releasing means at a predetermined ready position, locator means, means for advancing said locator means from a retracted position beyond said channel to an advanced position within said channel, means for selectively pushing the stopped workpiece past said biased pin means after said locator means has been displaced to said advanced position so that the workpiece will be gravitationally displaced to locate against said advanced locating means, and means for selectively retracting said locator means from said advanced position to said retracted position.

2. A loader assembly according in claim 1, further comprising means for selectively varying the position of said advanced position.

3. A loader assembly according to claim 1, further comprising means for selectively varying the position of said stopping means.

4. A loader assembly according to claim 1, wherein said pushing means comprises a hydraulic cylinder having a piston selectively advanceable from a retracted position to an advanced position.

5. A loader assembly according to claim 4, further comprising means for varying the advanced position of said piston.

* * * * *